W. C. BUSSEY.
Faucets.
No. 158,829.
Patented Jan. 19, 1875.
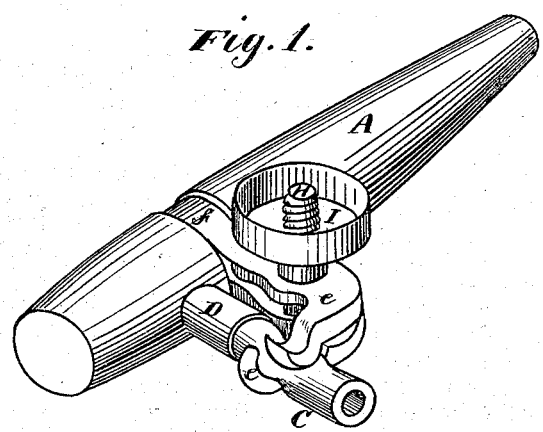
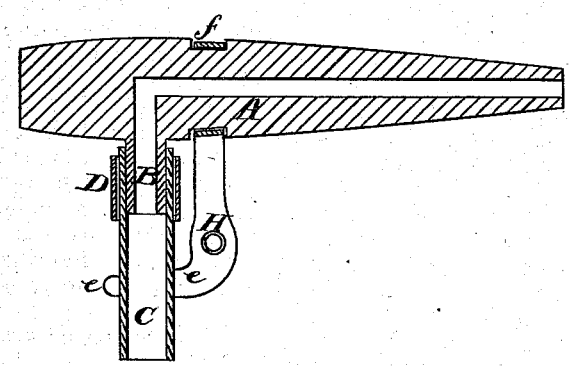
Witnesses
John L. Boone
C. M. Richardson
Inventor
William C. Bussey
by Dewey & Co.
Att'ys

UNITED STATES PATENT OFFICE.

WILLIAM C. BUSSEY, OF SAN FRANCISCO, CALIFORNIA.

IMPROVEMENT IN FAUCETS.

Specification forming part of Letters Patent No. 158,829, dated January 19, 1875; application filed December 3, 1874.

*To all whom it may concern:*

Be it known that I, WILLIAM C. BUSSEY, of San Francisco city and county, State of California, have invented an Improved Faucet; and I do hereby declare the following description and accompanying drawings are sufficient to enable any person skilled in the art or science to which it most nearly appertains to make and use my said invention or improvement without further invention or experiment.

The object of my invention is to provide a faucet for drawing liquids from barrels, casks, and other containing-vessels, through which the liquid can be drawn and its flow regulated without the employment of a rotating plug or spigot, thus not only providing a cheaply-manufactured faucet, but one which will have no joint to wear and leak.

Referring to the drawings, which form a part of this specification, Figure 1 is a perspective view of my faucet. Fig. 2 is a longitudinal section.

A is the hollow stem or barrel of the faucet, one end of which is driven into or otherwise secured in the barrel or cask from which the liquid is to be drawn. B is a short tubular plug or nozzle, which can be made of wood or other suitable material, and which is permanently secured to the stem A near its outer end, and at right angles to it. The hole through this plug or nozzle B communicates with the hole in the stem A, which leads from the vessel into which the faucet is secured, so that the liquid in the barrel or other vessel will pass through the stem A and nozzle B. Over the nozzle B I slip one end of a short india-rubber or other flexible tube, C, which is long enough to project an inch or two beyond the end of the nozzle, and in some instances I slip a metal ferrule or binder, D, over the tube, so as to bind it firmly upon the nozzle.

I then employ a clamping device for squeezing together the tube C just below the lower end of the nozzle B, for the purpose of cutting off and regulating the flow of liquid. The clamp which I use consists of two jaws, $e\ e$, which are connected by a circular spring, $f$. The spring $f$ fits in a groove around the stem A, near the nozzle B, so that the spring encircles the stem, while the two clamps extend downward, and are then bent at right angles, so that their extremities pass on each side of the tube C. A screw-rod, $h$, extends from one of the jaws $e$ through the opposite jaw, and a nut, I, screws upon this rod, so as to press the two jaws together, and clamp them upon the tube, so as to close the tube by compression.

I prefer to provide one of the jaws with a concave face, and the other with a convex face, at the point where they bear upon the tube, so that the compression will close the hole in the tube without compressing the edges of the tube too strongly.

By this means I provide a cheap and simple faucet, which will be easily managed.

Should the flexible tube C wear out, it can be easily replaced by a new one.

The faucet can be made of either wood, metal, or other material.

Having thus described my invention, what I claim, and desire to secure by Letters Patent, is—

The clamp consisting of the curved jaws $e\ e$, united by the circular spring $f$, said jaws being operated by the screw-rod $h$ and nut I, substantially as and for the purpose described.

In witness whereof I hereunto set my hand and seal.

WILLIAM C. BUSSEY. [L. S.]

Witnesses:
JNO. L. BOONE,
C. M. RICHARDSON.